US005761897A

United States Patent [19]

Kramer

[11] Patent Number: 5,761,897

[45] Date of Patent: Jun. 9, 1998

[54] METHOD OF COMBUSTION WITH A TWO STREAM TANGENTIAL ENTRY NOZZLE

[75] Inventor: Stephen K. Kramer, Stuart, Fla.

[73] Assignee: United Technologies Corporation, Hartford, Conn.

[21] Appl. No.: 770,278

[22] Filed: Dec. 20, 1996

[51] Int. Cl.$^{6}$ .................... F02C 7/22; F02K 3/12

[52] U.S. Cl. .................... 60/39.06; 60/737

[58] Field of Search .................... 60/39.06, 737, 60/738, 748; 431/173, 354

[56] References Cited

U.S. PATENT DOCUMENTS

| | | | |
|---|---|---|---|
| 5,307,634 | 5/1994 | Hu | 60/737 |
| 5,375,995 | 12/1994 | Dobbeling et al. | 60/737 |
| 5,461,865 | 10/1995 | Snyder et al. | 60/737 |
| 5,611,196 | 3/1997 | Wilson | 60/737 |
| 5,671,597 | 9/1997 | Butler et al. | 60/737 |

*Primary Examiner*—Louis J. Casaregola
*Attorney, Agent, or Firm*—Christopher T. Hayes

[57] ABSTRACT

A method for burning fuel in the combustor of a gas turbine engine with a premixing type of combustion which comprises providing a scroll swirler having first and second endplates, the first endplate is spaced relation to the second endplate defining a substantially cylindrical mixing zone therebetween, the second endplate having a combustor inlet port extending therethrough, providing a centerbody located within the mixing zone and having a radially outer surface that tapers toward the combustor inlet and extends substantially the entire length of the mixing zone, introducing a first portion of combustion air tangentially into the mixing zone substantially continuously along the length thereof, introducing a first portion of fuel into the combustion air as the combustion air is introduced into the mixing zone, mixing the combustion air and fuel by swirling the combustion air and fuel about the centerbody while flowing the combustion air and fuel towards the combustor inlet, flowing the first portion of combustion air into the combustor inlet, introducing a second portion of combustion air into the first portion radially inward thereof at the combustor inlet, the sum of the first and second portions of combustion air defining total airflow, and the second portion of combustion air equal to 85–89% of the total airflow, and burning the fuel external of the mixing zone.

4 Claims, 3 Drawing Sheets

METHOD OF COMBUSTION WITH A TWO STREAM TANGENTIAL ENTRY NOZZLE

TECHNICAL FIELD

This invention relates to low NOx premix fuel nozzles, and particularly to such nozzles for use in gas turbine engines.

BACKGROUND OF THE INVENTION

The production of nitrous oxides (hereinafter "NOx") occurs as a result of combustion at high temperatures. NOx and carbon monoxide ("CO") are notorious pollutants, and as a result, combustion devices which produce NOx and CO are subject to ever more stringent standards for emissions of such pollutants. Accordingly, much effort is being put forth to reduce the formation of NOx and CO in combustion devices.

One solution has been to premix the fuel with an excess of air such that the combustion occurs with local high excess air, resulting in a relatively low combustion temperature and thereby minimizing the formation of NOx. A fuel nozzle which so operates is shown in U.S. Pat. No. 5,307,634, which discloses a scroll swirler with a conical centerbody. This type of fuel nozzle is known as a tangential entry fuel nozzle, and comprises two offset cylindrical-arc scrolls connected to two endplates. Combustion air enters the swirler through two substantially rectangular slots formed by the offset scrolls, and exits through a combustor inlet port in one endplate and flows into the combustor. A linear array of orifices located on the outer scroll opposite the inner trailing edge injects fuel into the airflow at each inlet slot from a manifold to produce a uniform fuel air mixture before exiting into the combustor.

Premix fuel nozzles of the tangential entry type operating at lean fuel/air ratios have demonstrated low emissions of NOx relative to fuel nozzles of the prior art. Unfortunately, fuel nozzles such as the one disclosed in the aforementioned patent have exhibited combustion instabilities over the normal operating range thereof as a result of this lean operating condition.

What is needed is a method of operating a tangential entry fuel nozzle in at lean fuel/air ratios that achieve the goals of low NOx and low CO emissions without experiencing the combustion instabilities observed in the prior art.

SUMMARY OF THE INVENTION

It is therefore an object of the present invention to provide a method of operating a tangential entry fuel nozzle at lean fuel/air ratios that achieve the goals of low NOx and low CO emissions without experiencing the combustion instabilities observed in the prior art.

Accordingly, a method for burning fuel in the combustor of a gas turbine engine with a premixing type of combustion is disclosed which comprises providing a scroll swirler having first and second endplates, the first endplate is spaced relation to the second endplate defining a substantially cylindrical mixing zone therebetween, the second endplate having a combustor inlet port extending therethrough, providing a centerbody located within the mixing zone and having a radially outer surface that tapers toward the combustor inlet and extends substantially the entire length of the mixing zone, introducing a first portion of combustion air tangentially into the mixing zone substantially continuously along the length thereof, introducing a first portion of fuel into the combustion air as the combustion air is introduced into the mixing zone, mixing the combustion air and fuel by swirling the combustion air and fuel about the centerbody while flowing the combustion air and fuel towards the combustor inlet, flowing the first portion of combustion air into the combustor inlet, introducing a second portion of combustion air into the first portion radially inward thereof at the combustor inlet, the sum of the first and second portions of combustion air defining total airflow, and the second portion of combustion air equal to 85–89% of the total airflow, and burning the fuel external of the mixing zone.

BRIEF DESCRIPTION THE DRAWINGS

DESCRIPTION OF THE PREFERRED EMBODIMENT

Figure 1:
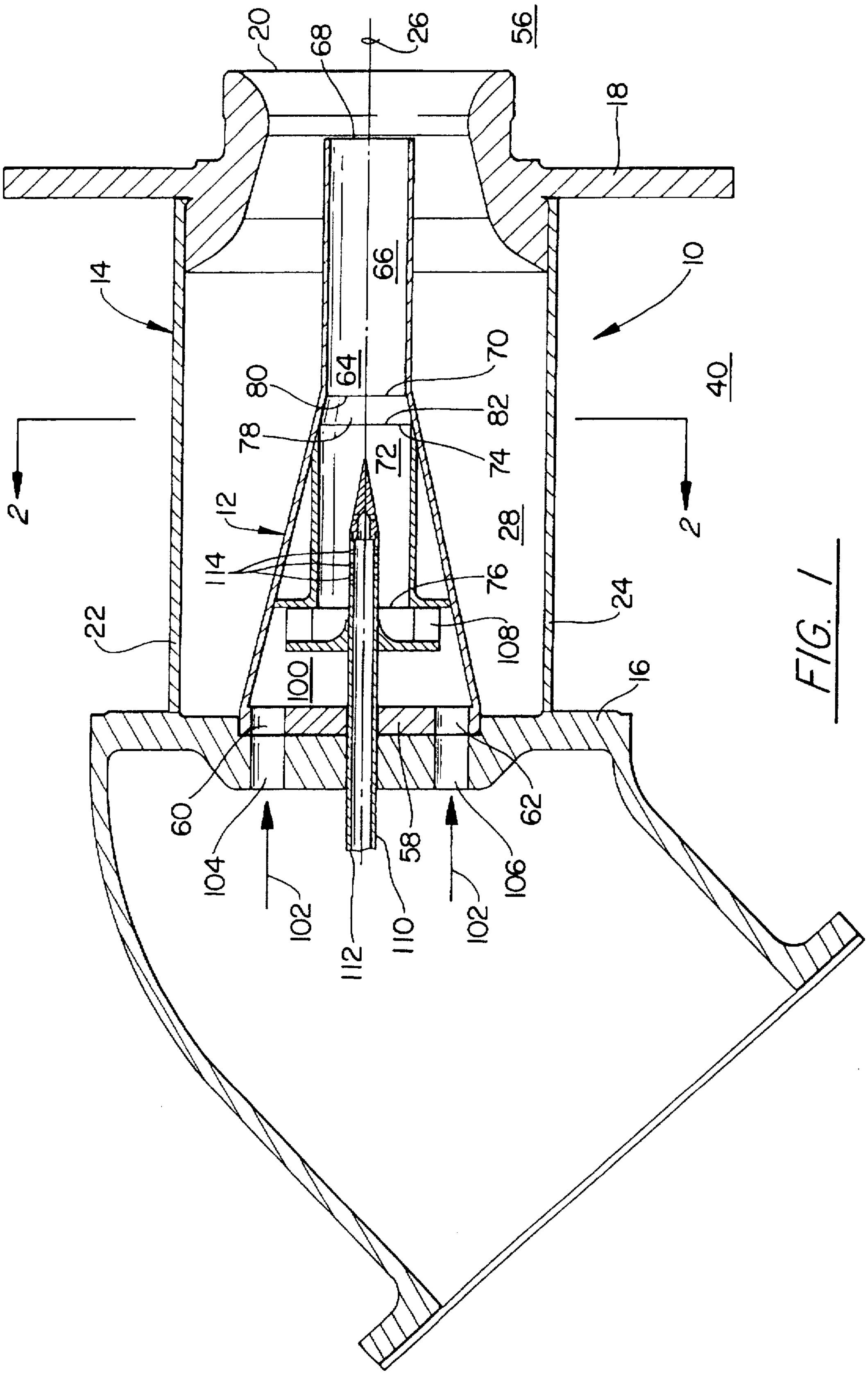
FIG. 1 is a cross-sectional view of the fuel nozzle of the present invention, taken along line 1—1 of FIG. 2.

Referring to FIG. 1, the low NOx premix fuel nozzle 10 of the present invention includes a centerbody 12 within a scroll swirler 14. The scroll swirler 14 includes first and second endplates 16,18, and the first endplate is connected to the centerbody 12 and is in spaced relation to the second endplate 18, which has a combustor inlet port 20 extending therethrough. A plurality, and preferably two, cylindrical-arc scroll members 22, 24 extend from the first endplate 16 to the second endplate 18.

Figure 2:
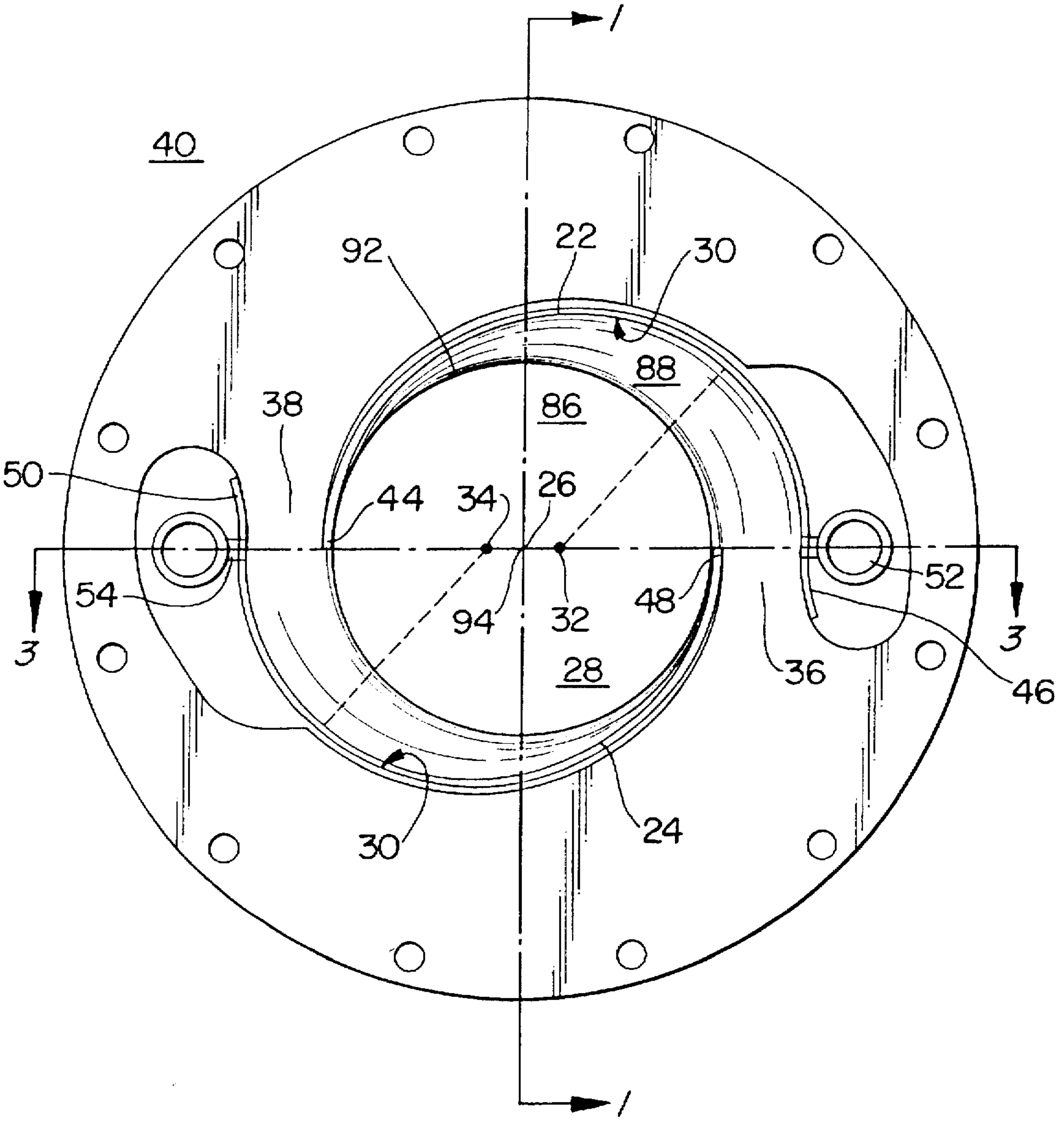
FIG. 2 is a cross-sectional view looking down the longitudinal axis of the nozzle of the present invention.

The scroll members 22, 24 are spaced uniformly about the longitudinal axis 26 of the nozzle 10 thereby defining a mixing zone 28 therebetween, as shown in FIG. 2. Each scroll member 22, 24 has a radially inner surface which faces the longitudinal axis 26 and defines a surface of partial revolution about a centerline 32, 34. As used herein, the term "surface of partial revolution" means a surface generated by rotating a line less than one complete revolution about one of the centerlines 32, 34.

Figure 3:
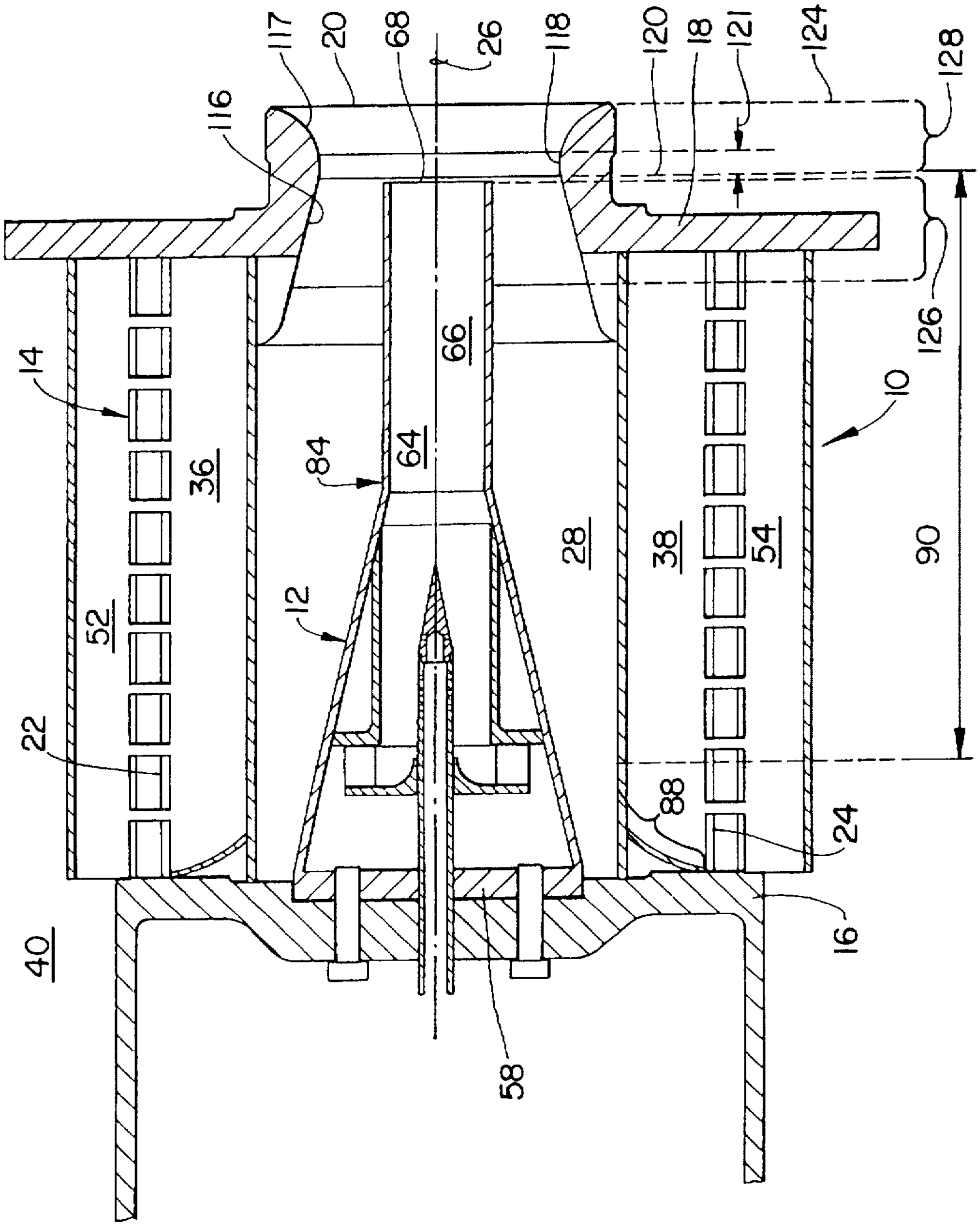
FIG. 3 is a cross-sectional view of the fuel nozzle of the present invention, taken along line 3—3 of FIG. 2.

Each scroll member 22 is in spaced relation to the other scroll member 24, and the centerline 32, 34 of each of the scroll members 22, 24 is located within the mixing zone 28, as shown in FIG. 2. Referring to FIG. 3, each of the centerlines 32, 34 is parallel, and in spaced relation, to the longitudinal axis 26, and all of the centerlines 32, 34 are located equidistant from the longitudinal axis 26, thereby defining inlet slots 36, 38 extending parallel to the longitudinal axis 26 between each pair of adjacent scroll members 22, 24 for introducing combustion air 40 into the mixing zone 28. Combustion supporting air 42 from the compressor (not shown) passes through the inlet slots 36, 38 formed by the overlapping ends 44, 50, 48, 46 of the scroll members 22, 24 with offset centerlines 32, 34.

Each of the scroll members 22, 24 further includes a fuel conduit 52, 54 for introducing fuel into the combustion air 40 as it is introduced into the mixing zone 28 through one of the inlet slots 36, 38. A first fuel supply line (not shown), which may supply either a liquid or gas fuel, but preferably gas, is connected to the each of the fuel conduits 52, 54. The combustor inlet port 20, which is coaxial with the longitudinal axis 26, is located immediately adjacent the combustor 56 to discharge the fuel and combustion air from the present invention into the combustor 56, where combustion of the fuel and air takes place.

Referring back to FIG. 1, the centerbody 12 has a base 58 that has at least one, and preferably a plurality, of air supply ports 60, 62 extending therethrough, and the base 58 is perpendicular to the longitudinal axis 26 extending therethrough. The centerbody 12 also has an internal passageway 64 that is coaxial with the longitudinal axis 26. In the preferred embodiment of the invention, the internal passageway 64 includes a first cylindrical passage 66 having a first end 68 and a second end 70, and a second cylindrical passage 72 of greater diameter than the first cylindrical passage 66 and likewise having a first end 74 and a second end 76. The second cylindrical passage 72 communicates with the first cylindrical passage 66 through a tapered passage 78 having a first end 80 that has a diameter equal to the diameter of the first cylindrical passage 66, and a second end 82 that has a diameter equal to the diameter of the second cylindrical passage 72. Each of the passages 66, 72, 78 is coaxial with the longitudinal axis 26, and the first end 80 of the tapered passage 78 is integral with the second end 70 of the first cylindrical passage 66, while the second end 82 of the tapered passage 78 is integral with the first end 74 of the second cylindrical passage 72. The first cylindrical passage 66 includes a discharge orifice 68 that is circular and coaxial with the longitudinal axis 26, and is located at the first end 68 of the first cylindrical passage 66.

Referring to FIG. 3, the radially outer surface 84 of the centerbody 12 is includes a frustum portion 86, which defines the outer surface of a frustum that is coaxial with the longitudinal axis 26 and flares toward the base 58, and a cylindrical portion 88 which is integral with the frustum portion 86, defines the surface of a cylinder, and is coaxial with the axis 26. In the preferred embodiment, the cylindrical portion 88 terminates at the plane within which the discharge orifice 68 is located, the diameter of the frustum portion 86 at the base 58 is 2.65 times greater than the diameter of the frustum portion 86 at the apex thereof, and the height 90 of the frustum portion 86 (the distance between the plane in which the base 58 meets the frustum portion 86 and the plane in which the apex of the frustum portion 86 is located) is approximately 1.3 times the diameter of the frustum portion 86 at the base 58. The cylindrical portion 88, which is located between the frustum portion 86 and the discharge orifice 68. As shown in FIG. 3, the internal passageway 64 is located radially inward from the radially outer surface 84 of the centerbody 12, the frustum portion 86 is coaxial with the longitudinal axis 26, and the centerbody 12 is connected to the base 58 such that the frustum portion 86 tapers toward, and terminates at the cylindrical portion 88. As shown in FIG. 2, the base of the frustum portion 86 fits within a circle 92 inscribed in the mixing zone 28 and having its center 94 on the longitudinal axis 26. As those skilled in the art will readily appreciate, the mixing zone 28 is not circular in cross section.

Referring to FIG. 1, an internal chamber 100 is located within the centerbody 12 between the base 58 and the second end 76 of the second cylindrical passage 72, which terminates at the chamber 100. Air 102 is supplied to the chamber 100 through the air supply ports 60, 62 in the base 58 which communicate therewith, and the chamber 100, in turn, supplies air to the internal passageway 64 through the second end 76 of the second cylindrical passage 72. The first endplate 16 has openings 104, 106 therein that are aligned with the air supply ports 60, 62 of the base 58 so as not to interfere with the flow of combustion air 102 from the compressor of the gas turbine engine. A swirler 108, preferably of the radial inflow type known in the art, is coaxial with the longitudinal axis 26 and is located within the chamber 100 immediately adjacent the second end 76 of the second cylindrical passage 72 such that all air entering the internal passageway 64 from the chamber 100 must pass through the swirler 108.

A fuel lance 110, which likewise is coaxial with the longitudinal axis 26, extends through the base 58, the chamber 100, and the swirler 108, and into the second cylindrical passage 72 of the internal passageway 64. The larger diameter of the second cylindrical passage 72 accommodates the cross-sectional area of the fuel-lance 110, so that the flow area within the second cylindrical passage 72 is essentially equal to the flow area of the first cylindrical passage 66. A second fuel supply line (not shown), which may supply either a liquid or gas fuel, is connected to the fuel lance 110 to supply fuel to an inner passage 112 within the fuel lance 110. Fuel jets 114 are located in the fuel lance 110, and provide a pathway for fuel to exit from the fuel lance 110 into the internal passageway 64.

Referring to FIG. 3, the combustor inlet port 20 is coaxial with the longitudinal axis 26 and includes a convergent surface 116, a divergent surface 117, and a cylindrical surface 118 that defines the throat plane 120 of the inlet port 20. The convergent surface 116, the divergent surface 117, and the cylindrical surface 118 are coaxial with the longitudinal axis 26, and the convergent surface 116 is located between the first endplate 16 and the cylindrical surface 118. The convergent surface 116 is substantially conical in shape and tapers toward the cylindrical surface 118, while the divergent surface is preferably defined by rotating a portion of an ellipse about the longitudinal axis 26.

The cylindrical surface 118 extends a finite distance 121 between the throat plane 120 and the divergent surface. The divergent surface 117 extends between the cylindrical surface 118 the combustor surface 122 of the combustor port inlet 20, which is perpendicular to the longitudinal axis 26, and defines the exit plane 124 of the fuel nozzle 10 of the present invention. To achieve the desired axial velocity of the fuel/air mixture through the combustor inlet port 20, the combustion air flowing therethrough must encounter the minimum flow area, or throat area, at the combustor inlet port 20. To achieve this result, the cylindrical surface 118 is located at a predetermined radius from the longitudinal axis 26 that is at least 10% less than the radius of the frustum portion 86 at the base 58.

The convergent surface 116 terminates at the throat plane 120, where the diameter of the convergent surface 116 is equal to the diameter of the cylindrical surface 118. As shown in FIG. 3, the throat plane 120 is located between the exit plane 124 and the discharge orifice 68 of the internal passageway 64, and the convergent surface 116 is located between the cylindrical surface 118 and the first endplate 16. In order to establish the desired velocity profile of the fuel/air mixture within the combustor inlet port 20, the convergent surface 116 extends a predetermined distance 126 along the longitudinal axis 26 and the cylindrical surface 118 extends a second distance 128 along the longitudinal axis 26 that is at least 5% of the predetermined distance 126.

In operation, 11–15% of the total airflow through the fuel nozzle 10 is introduced through the openings 104, 106 and the air supply ports 60, 62 in the base 58 and into the chamber 100 of the centerbody 12. The combustion air exits the chamber 100 through the radial inflow swirler 108 and enters the internal passageway 64 with a substantial tangential velocity, or swirl, relative to the longitudinal axis 26. When this swirling combustion air passes the fuel lance 110, fuel, preferably in gaseous form, is sprayed from the fuel lance 110 into the internal passage 64 and mixes with the swirling combustion air. The mixture of fuel and combustion air then flows from the second cylindrical passage 72 into the first cylindrical passage 66 through the tapered passage 78. The mixture then proceeds down the length of the first cylindrical passage 66, exiting the first cylindrical passage 66 just short of, or at, the throat plane 120 of the combustor inlet port 20, providing a central stream of fuel/air mixture.

Additional combustion air equal to 85–89% of the total airflow through the fuel nozzle 10 is introduced into the mixing zone 28 through the inlet slots 36, 38. As used herein, the term total airflow means the sum of the combustion air entering through the inlet slots 36, 38 and the combustion air entering through the air supply ports 60,62. Fuel, preferably gaseous fuel, supplied to the fuel conduits 52, 54 is sprayed into the combustion air passing through the inlet slots 36, 38 and begins mixing therewith. Due to the shape of the scroll members 22, 24, this mixture establishes an annular stream swirling about the centerbody 12, and the fuel/air mixture continues to mix as it swirls thereabout while progressing along the longitudinal axis 26 toward the combustor inlet port 20. Fuel air concentrations have been specified in such a fashion that if the overall desired fuel/air ratio was 0.5 times that required for stoichiometric combustion, then the central stream would have a fuel/air ratio of 0.54 times stoichiometric and the rest of the flow would have a fuel/air ratio 0.493 times stoichiometric.

The swirl of the annular stream produced by the scroll swirler 14 is preferably co-rotational with the swirl of the fuel/air mixture in the first cylindrical passage 66, and preferably has an angular velocity at least as great as the angular velocity of the of the fuel/air mixture in the first cylindrical passage 66. Due to the shape of the centerbody 12, the axial velocity of the annular stream is maintained at speeds which prevent the combustor flame from migrating into the scroll swirler 14 and attaching to the outer surface 84 of the centerbody 12. Upon exiting the first cylindrical passage 66, the swirling fuel/air mixture of the central stream is surrounded by the annular stream of the scroll swirler 14, and the two streams flow radially inward of the cylindrical surface 118 and then the divergent surface 117 until reaching the exit plane 124 of the combustion inlet port 20 downstream of the mixing zone 28.

Testing of the fuel nozzle 10 of the present has demonstrated lean fuel/air ratios that achieve the goals of low NOx and low CO emissions without experiencing the combustion instabilities observed in the prior art. Key to the operation of the nozzle is the division of the air and fuel between the two streams. Enough fuel must pass through the central stream that the overall flame is stabilized by its presence, yet the fuel/air ratio should not be so high as to cause significant NOx production nor rob the rest of the flame of fuel. Further, the fuel supplied to the two air streams must be manifolded and controlled independently, to allow the proportion of fuel in the central stream to be varied during operation in order to obtain optimum emissions.

This invention differs from other piloting and stabilizing methodologies in several ways. First, this invention is being applied to lean, premixed systems. Both streams are premixed, with one stream being only slightly more fuel rich than the other. This produces significantly lower emissions than the traditional methodology of piloting with a diffusion flame. Indeed, the present invention is not "piloting" since its function is not to provide a flame source in the absence of flame elsewhere but rather to provide a flame with extended stability characteristics and low emissions.

Second, the two (or more) streams form a single, integrated, unified flame front. While it may be argued that contiguous flames always form a single flame front, the essence of this invention is the subtle manipulation and control of the fuel species in single flame structure. In the tested embodiments that were most successful, the two streams nearly matched each other in fuel/air ratio, in axial velocity, in rotation, and in temperature, with the differences being slight (i.e. 10% difference in fuel/air ratio). Thus, the benefits of fuel lean flames are obtained while lessening some of their restrictions.

Third, the streams are physically separate and can be controlled independently. Liquid-fuel injectors often use a differentiation in droplet size or velocity to produce richer and leaner portions of the flame in order to extend flame stability and reduce emissions. Similarly, the fuel ports in a lean, premixed, gaseous fuel injector may be differentially sized or located in order to produce fuel-rich and fuel-lean portions of the flame. Or the aerodynamics may be so controlled as to produce separation in such a fashion as to promote a fuel-rich or fuel-lean environment. The invention presented here differs from these in that the streams are kept physically separate until they nearly enter the combustion zone, with only enough mixing time permitted to allow the formation of the single, integrated, unified flame front described above.

Although this invention has been shown and described with respect to a detailed embodiment thereof it will be understood by those skilled in the art that various changes in form and detail thereof may be made without departing from the spirit and scope of the claimed invention.

I claim:

1. A method for burning fuel in the combustor of a gas turbine engine with a premixing type of combustion, comprising providing a scroll swirler having first and second endplates, said first endplate in spaced relation to said second endplate defining a substantially cylindrical mixing zone therebetween, said second endplate having a combustor inlet port extending therethrough;

providing a centerbody located within said mixing zone and having a radially outer surface that tapers toward the combustor inlet and extends substantially the entire length of the mixing zone;

introducing a first portion of combustion air tangentially into said mixing zone substantially continuously along the length thereof;

introducing a first portion of fuel into said combustion air as said combustion air is introduced into said mixing zone;

mixing said combustion air and fuel by swirling said combustion air and fuel about said centerbody while flowing said combustion air and fuel towards said combustor inlet;

flowing said first portion of combustion air into said combustor inlet;

introducing a second portion of combustion air into said first portion radially inward thereof at said combustor inlet, the sum of said first and second portions of combustion air defining total airflow, and said second portion of combustion air equal to 85–89% of said total airflow; and, burning said fuel external of said mixing zone.

2. The method of claim 1 wherein the step of introducing a second portion of combustion air into said first portion radially inward thereof at said combustor inlet includes introducing a second portion of combustion air into said centerbody, introducing a second portion of fuel into said second portion of combustion air, and mixing said second portion of fuel with said second portion of combustion air.

3. The method of claim 2 wherein said first portion of fuel divided by said first portion of combustion air defines a first fuel/air concentration, said second portion of fuel divided by said second portion of combustion air defines a second fuel/air concentration, the overall desired fuel/air ratio is 0.5 times that required for stoichiometric combustion, said first fuel/air concentration is 0.493 times stoichiometric said second fuel/air concentration is 0.54 times stoichiometric.

4. The method of claim 3 wherein the step of introducing a second portion of combustion air into said first portion radially inward thereof at said combustor inlet is preceded by the step of swirling said second portion of combustion air within said centerbody at an angular velocity substantially equal to the angular velocity of the first portion.

* * * * *

UNITED STATES PATENT AND TRADEMARK OFFICE

CERTIFICATE OF CORRECTION

PATENT NO. : 5,761,897
APPLICATION NO. : 08/770278
DATED : June 9, 1998
INVENTOR(S) : Stephen K. Kramer, Stephen A. Morfold and Charles B. Graves It is certified that error appears in the above-identified patent and that said Letters Patent is hereby corrected as shown below:

Title Page, item

Inventor [75]: Add Stephen A. Morford and Charles B. Graves

Abstract [57], next to last line, change “85-89%” to --11-15%--

Column 2, line 9, change “85-89%” to --11-15%--

Column 6, line 62 change “85-89%” to --11-15%--

Signed and Sealed this

Twenty-ninth Day of August, 2006

JON W. DUDAS

*Director of the United States Patent and Trademark Office*